Oct. 16, 1962  G. W. STANTON ET AL  3,058,950
GRAFT COPOLYMERS OF N-VINYL-3-MORPHOLINONE ON POLYOLEFIN
SUBSTRATES AND METHOD OF MAKING SAME
Filed Jan. 7, 1959
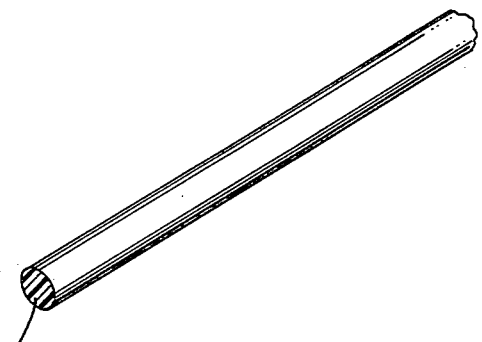
Filamentous article comprising a graft copolymer of N-vinyl-3-morpholinone on a polyolefin polymer substrate.
INVENTORS.
George W. Stanton
Teddy G. Traylor
BY Jerome Rudy
ATTORNEY United States Patent Office 3,058,950
Patented Oct. 16, 1962

3,058,950
GRAFT COPOLYMERS OF N-VINYL-3-MORPHO-LINONE ON POLYOLEFIN SUBSTRATES AND METHOD OF MAKING SAME
George W. Stanton, Williamsburg, Va., and Teddy G. Traylor, Concord, Calif., assignors to The Dow Chemical Company, Midland, Mich., a corporation of Delaware
Filed Jan. 7, 1959, Ser. No. 785,385
6 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of monomeric N-vinyl-3-morpholinone polymerized on non-aromatic, hydrocarbon polymer substrates which may hereinafter be more simply referred to as "polyolefin polymers" or merely as "polyolefins."

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Non-aromatic, hydrocarbon polyolefin polymers may be utilized with great advantage for such purposes.

The polyolefin materials that are contemplated as being adapted for utilization as substrates in the practice of the present invention include any of the normally solid (i.e., under standard conditions and/or at room temperature) non-aromatic, hydrocarbon olefin polymers, such as polyethylene, polypropylene, copolymers of ethylene and propylene and the like, that have been prepared from monomeric, non-aromatic hydrocarbon, monolefinic monomers containing from 2 to 6 carbon atoms in their molecule, such as ethylene, propylene, 4-methylpentene and the like. It is especially advantageous to utilize a polypropylene composition, particularly one of the fiber-forming variety, for this purpose. In this connection, it is generally desirable for the polyolefin that is employed to be one of the relatively more recent macromolecular, essentially linear and high density species of polymers that have become available and which are generally characterized by their essentially linear, unbranched molecular configurations, and which may be made (among several diverse procedures) under the influence of such catalyst systems as have been described in Belgian Patent No. 533,362 (which are frequently known as being Ziegler-type catalysts). If desired, however, polyethylene may be utilized which is of the conventional, generally branch structured variety that has ordinarily been polymerized under relatively high pressures and is oftentimes referred to and known as being a "polythene."

Difficulty is often encountered in dyeing or coloring synthetic hydrophobic fibers and the like that have been prepared from non-aromatic, hydrocarbon olefin polymers. This is especially so when it is attempted to obtain relatively deeper shades of coloration in the finally dyed product.

Various techniques have been evolved for providing polyolefin compositions of improved dyeability. The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified polyolefin polymers. Also, such products, once they have been prepared, may not be as receptive as might be desired to a wide range of dyestuffs, due to inherent limitations in the materials capable of being employed for enhancing dye-receptivity.

It would be advantgeous, and it is the chief aim and concern of the present invention, to provide non-aromatic, hydrocarbon polyolefins which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified polyolefin polymer substrates, and of the general order obtainable with polypropylene, for example. This would possibilitate the manufacture of non-aromatic, hydrocarbon polyolefin based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which consists of a preformed non-aromatic, hydrocarbon polyolefin substrate having a minor proportion of substituents graft copolymerized thereto consisting essentially of polymerized N-vinyl-3-morpholinone monomers. Schematically, the compositions may be structurally represented in the following manner:

$$-\text{PYOL}-\text{PYOL}-\text{PYOL}-\text{PYOL}-\text{PYOL}-\text{PYOL}-$$
$$\phantom{-}\;\;\;|\phantom{XXX}|\phantom{XXX}|\phantom{XXX}|\phantom{XXX}|\phantom{XXX}|$$
$$\phantom{-}\;\text{VM}\;\;\;\text{VM}\;\;\;\text{VM}\;\;\;\text{VM}\;\;\;\text{VM}\;\;\;\text{VM}$$
$$\phantom{-}\;\;\;|\phantom{XXX}|\phantom{XXX}|\phantom{XXX}|\phantom{XXX}|\phantom{XXX}|$$

wherein the interlinked "PYOL" symbols represent the preformed polyolefin polymer substrate or "backbone" trunk and the symbols "VM" connected thereto the substituent graft copolymer branches of the indicated N-vinyl-3-morpholinone monomer provided thereon. As is apparent, the substituent graft copolymerized N-vinyl-3-morpholinone branches or units are chemically attached to the polyolefin substrate through carbon linkages.

The graft copolymer substituent that is combined with the polyolefin polymer substrate lends the desired receptivity of and substantivity for various dyestuffs to the compositions while the non-aromatic, hydrocarbon polyolefin polymer trunk substrate that is so modified facilitates and secures the excellent physical properties and characteristics of the various shaped articles, including fibers, into which the compositions may be fabricated.

Advantageously, as mentioned, the polyolefin polymer substrate that is modified by graft copolymerization to provide the compositions of the invention is polypropylene, particularly that of the fiber-forming variety.

It is usually beneficial, as has been indicated, for the graft copolymer compositions of the present invention to contain a major proportion of the polyolefin polymer trunk or substrate that has been modified with the substituent dye-receptive graft copolymer groups chemically attached thereto. As a general rule, for example, it is desirable for the graft copolymer to be comprised of at least about 80 percent by weight of the polyolefin polymer substrate. In many instances, it may be satisfactory for the graft copolymer composition to be comprised of between about 85 and 95 percent by weight of the polyolefin polymer substrate, particularly when it is polypropylene. In this connection, however, better dyeability may generally be achieved when the grafted copolymeric substituents are prepared under such conditions that they have relatively long chain lengths. Thus, it is usually preferable, when identical quantities of grafted substituents are involved for relatively fewer, but longer chain length grafts to be available than to have a greater number of substituents of relatively shorter chain length.

The N-vinyl-3-morpholinone monomer which is utilized to modify the acrylonitrile polymer substrates so as to provide the graft copolymer compositions of the present invention is of the general structure:

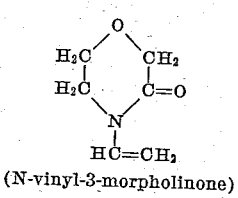

(N-vinyl-3-morpholinone)

This monomer, also for sake of convenience and brevity, is hereinafter referred to as "VM." As is apparent, the monomeric VM may in many cases be utilized in combination or mixtures with certain of its homologues, such as the various alkyl (particularly methyl and ethyl)-ring-substituted-N-vinyl-3-morpholinones. VM may also be termed 4-vinyl-3-morpholinone.

The monomeric material employed for preparation of graft copolymers on preformed polyolefin substrates in practice of the present invention is disclosed and described in United States Letters Patent No. 2,891,058.

As mentioned, the graft copolymer compositions of the invention have remarkably good dye-receptivity, particularly in view of their polyolefin polymer origin. In most cases, for example, the dye-receptivity of the graft copolymer compositions of the present invention is improved to such an extent in comparison with unmodified polyolefin polymers, particularly unmodified polypropylene, that a color differential of at least about 40 Judd units, as hereinafter illustrated, may readily be obtained between samples of the unmodified polyolefin polymer substrate and the graft copolymer compositions of the present invention, each of which have been dyed at a 4 percent dyeing, according to conventional techniques with such a dyestuff as Calcodur Pink 2BL. This is a significant advantage when the compositions are fabricated into shaped article form, especially when they are prepared in a filamentary form suitable for use as a textile material.

Judd units are explained in an article by D. B. Judd in the "American Journal of Psychology," vol. 53, page 418 (1939). More information concerning Judd units appears in "Summary on Available Information on Small Color Difference Formulas" by Dorothy Nickerson in the American Dyestuff Reporter, vol. 53, page 252, June 5, 1944. Also see "Interrelation of Color Specifications" by Nickerson in "The Paper Trade Journal," vol. 125, page 153 for November 6, 1947.

As is well known, Calcodur Pink 2BL is a direct type of dye that has a Colour Index of 353. It is commercially obtainable under the indicated trade-designation. The same dyestuff, which is the sodium salt of 3,3'-disulphodiphenyl - urea - 4,4' - diazobis - 2 - amino - 8-naphthol-6-sulfonic acid, is actually available (frequently under other commercial designations) from several commercial sources. Calcodur Pink 2BL has the following structural formula, as is given on page 88, Section A, Part IV of the "Colour Index" (1st ed., 1924) published by the (British) Society of Dyers and Colourists:

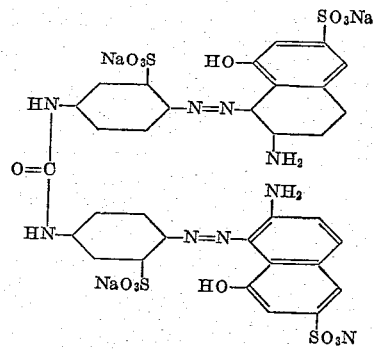

More recently, the Colour Index identification number of Calcodur Pink 2BL has been established as Direct Red 75.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using acid, vat, acetate, direct, naphthol, and sulfur dyes. Such dyestuffs, in addition to the particular variety mentioned, by way of didactic illustration, as Calcocid Alizarine Violet (Colour Index 61710, formerly Colour Index 1080), Sulfanthrene Red 3B (Colour Index Vat Violet 2), Amacel Scarlet BS (Colour Index Dispersed Red 1 or 11110), Naphthol ASMX (Colour Index 35537), Fast Red TRN Salt (Colour Index Azoic Diazo 11), and Immedial Bordeaux G (Colour Index Sulfur Brown 12) may advantageously be employed for such purposes.

Other dyestuffs, by way of further illustration, that may be utilized beneficially on the N - vinyl - 3 - morpholinone graft copolymer compositions of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Bdl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products, especially textile fiber products, are generally lightfast and are well imbued with good resistance to crocking. In addition, dyed textile fiber products comprised of the compositions of the invention exhibit remarkable washfastness, despite repeated exposure and subjection to washing, laundering and dry cleaning treatments.

A shaped filamentary article prepared from a dye-receptive composition in accordance with the present invention is schematically illustrated in the sole FIGURE of the hereto annexed drawing.

The dye-receptive graft copolymers of the present invention may be prepared and provided by swelling or impregnating the polyolefin polymer substrate with the monomeric substance then polymerizing the monomer in situ in the substrate. Advantageously, this may be accomplished when the substrate is in the form of an already shaped article, such as a fiber or filamentary structure. Beneficially, the graft copolymerization of impregnated monomer may be accomplished and facilitated with the assistance of a polymerization catalyst or catalyzing influence which, preferentially, interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, and actinic radiations, including ultraviolet light, may be utilized for the desired graft copolymerization. It may often be exceptionally advantageous, however, to accomplish the graft copolymerization by subjecting the monomer-impregnated polyolefin polymer substrate to a field of high energy radiation in order to efficiently provide an effectively attached graft copolymer of the polymerized monomeric impregnant on the hydrophobic polyolefin polymer substrate. Excellent results may also be achieved by activating the polyolefinic polymer substrate prior to contact with the monomer so as to generate or create free radical sites upon the substrate to which the monomer may attach in order to form the graft polymerized substituents. Such activation, as is known, may be accomplished by means of pre-irradiation in fields of high energy radiation (including ultraviolet light) or by exposing the polyolefinic polymer substrate to the influence of oxygen (in the presence of ultraviolet light) or to already formed ozone prior to contact with the graft copolymer-forming monomer.

The monomer may be intimately impregnated in the polyolefin polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the polyolefin polymer substrate with the latter being immersed in the bath for a sufficient period of time to attain a desired monomer content adequate for the intended purpose. The polyolefin polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the polyolefin polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose. Graft copolymerization on preactivated substrates may ordinarily be accomplished by simply exposing the activated substrate to the monomer (preferably in concentrated) solution, at an elevated temperature until the graft copolymerized substituents have formed on the substrate.

When the graft copolymer compositions are prepared from preformed or already shaped polyolefin polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with the greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the polyolefin polymer substrate being modified in order to provide the compositions of the present invention. In addition, as has been indicated, particularly when preactivation of the substrate is performed, ultraviolet light may also be employed as the high energy radiation form, including its use in combination with oxygen or ozone.

For purposes of specifically illustrating, without intending to thereby limit the invention, the following didactic exemplifications are provided wherein, unless otherwise indicated, all parts and percentages are to be taken by weight.

Illustration A

Fine fibers of polypropylene having an average size of about 3 denier are manufactured by melt spinning a propylene polymer having an apparent molecular weight of about 100 thousand (as indicated by its melt viscosity), and a melting point of about 170° C. The polypropylene fibers are swollen with N-vinyl-3-morpholinone (VM) at a temperature of 70 to 90° C. The monomer is impregnated in the fiber by immersing the fiber sample in the liquid monomer. After the impregnation, excess monomer is removed by squeezing and the wet fiber, containing about 20 percent of the monomer impregnated therein, is then exposed at a distance of about 1 centimeter from a Machlett OEG–50 tube that is being operated at 50 thousand volts and 50 milliamperes. The exposure is continued for about 5 minutes. The irradiated yarn is then dried, scoured in a ½ percent aqueous solution of a non-ionc detergent and dyed with Calcodur Pink 2BL.

The dyeing with Calcodur Pink 2BL is performed at the 4 percent level according to the usual procedure in which the fiber sample is maintained for about one hour at the boil in the dyebath which contains the dyestuff in about an amount equal to about 4 percent of the weight of the fiber. The dyebath also contains sodium sulfate in an amount equal to about 15 percent of the weight of the fiber and has a bath-to-fiber weight ratio of 30:1. After being dyed, the fiber is rinsed in water and dried for about 20 minutes at 80° C. The dye-receptivity of the Calcodur Pink 2BL-dyed fiber is evaluated spectrophotometrically by measuring the amount of monochromatic light having a wave length of about 520 millimicrons from a standard source that is reflected from the dyed sample. The numerical value obtained is taken along an arbitrarily designated scale from 0 to 100. This value represents the relative comparison of the light that was reflected from a standard white tile reflector that has a reflectance value of 316 by extrapolation from the 0 to 100 scale.

Lower reflectance values are an indication of better dye-receptivity in the fiber. For example, a reflectance value of about 20 to 50 for polyolefin polymer fibers dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval.

The 4 percent Calcodur Pink 2BL reflectance value of the graft copolymerized polypropylene fiber sample is found to be about 15. Ordinary unmodified polypropylene fibers of the same type used for the preparation of the graft copolymerized product generally have a reflectance value of about 120 on the same numerical scale. Thus, the improvement in dye-receptivity between the graft copolymerized fiber product of the present invention in comparison with unmodified polypropylene polymers is such that a color differential of about 60 Judd units is obtained between the dyed graft copolymer composition and the unmodified polypropylene fiber.

The graft copolymerized fiber product also dyes well to deep and level shades of coloration with Calcocid Alizarine Violet and Amacel Scarlet BS.

Illustration B

The procedure of Illustration A is repeated with the exception that the monomer-impregnated propylene fiber sample is rinsed with n-heptane immediately prior to radiation and is subjected to a total exposure in the X-ray beam for 20 minutes instead of 5. The results obtained are at least commensurate with those realized in the first illustration.

Illustration C

The procedure of Illustration A is repeated with the exception that the irradiation exposure is 10 minutes instead of 5. The resulting fiber dyes to extremely deep and level shades of coloration, without evidence of ring-dyeing effects, when dyed with Calcodur Pink 2BL and the other mentioned dyestuffs in the manner set forth in the first illustration.

Illustration D

The procedure of Illustration C is repeated, excepting to employ a mixture of 97 percent VM and 3 percent water as the impregnating polypropylene-swelling monomer solution. The same results are obtained as in the third illustration.

Illustration E

The procedure of Illustration C is repeated excepting to employ a mixture of 90 percent of the VM and 10 percent of acetone for the impregnating polypropylene-swelling monomer solution. The results obtained are about the same as those achieved in Illustration C.

Illustration F

The procedure of Illustration D is duplicated with the exception that the impregnation of the polypropylene with the aqueous VM monomer is performed at a temperature of about 25° C. The dyeability of the resulting graft copolymerized product is still excellent, despite the fact that it may tend to be slightly less than that of the product obtained in the fourth illustration.

Illustration G

A film of polypropylene similar to that employed in fiber form in the first illustration is placed about 3½ inches below an Hanovia Ultraviolet Lamp which is contained in a fritted glass funnel. The polypropylene film has an average thickness of about 15 mils. The film is exposed to the ultraviolet light for about one hour while a stream of oxygen is being continuously passed thereover so as to generate free radical graft sites on the polymer due to the oxidative influence of oxygen. The oxygen-treated film is then heated for about 12 hours in monomeric VM at a temperature of 120° C. The graft copolymerized film product is then rinsed with water and dyed for one hour at the boil with Calcodur Pink 2BL in a manner analogous to that set forth in the first illustration. A very deep and uniform red shade of coloration is obtained in the graft copolymerized product. Its reflectance value is less than 10 and it shows a Judd Unit improvement of at least 70 units over a plain polypropylene film.

Illustration H

A polypropylene powder obtained from a polymer similar to that employed for the fibers in the first illustration is treated with ultraviolet light and oxygen as in Illustration G. Another sample of the same polymer powder is subjected to an ozone treatment at 100° C. for a 2 minute period. A third sample is left untreated. All three samples are placed in a mixture of 90 percent VM and 3 percent water at 100° C. for an 18 hour period. They are then rinsed and dyed as in Illustration G. The reflectance value of each of the dyed polymer samples is then determined in accordance with the manner set forth in the first illustration. The ozone-treated and graft copolymerized film sample has a Calcodur Pink 2BL reflectance value of about 40. The ultraviolet light and oxygen treated sample has a reflectance value of about 50. The untreated sample of film that is immersed in the monomeric mixture and dyed has a reflectance value of about 95. For purposes of comparison, the completely untreated and undyed powder has a reflectance value in excess of 100. An improvement of about 20-25 Judd Units is obtained in the graft copolymer product.

*Illustration I*

Several samples of polypropylene fibers similar to those employed in the first illustration are treated as in Illustration H with the exception that the sample exposed to the ozone treatment is subjected to the ozone for 1½ hours at 25° C. Each of the samples is then dyed with Calcodur Pink 2BL in the indicated manner. The ultraviolet and oxygen treated fiber sample has a Calcodur Pink 2BL reflectance value of about 80. The sample treated with ozone prior to graft copolymerization and subsequently dyed has a reflectance value of about 11. The untreated fiber sample that is immersed in the monomeric mixture and subsequently dyed has a reflectance of about 80. In comparison, a completely untreated and undyed control sample of the same fiber has a reflectance value of greater than 100.

*Illustration J*

A small sample of about 3 denier fiber prepared from crystalline poly-4-methylpentene is pre-irradiated by exposure at room temperature to a high energy-X-ray radiation beam from a Van de Graaff Electrostatic Generator operating under a potential of 2 million electron volts with a 250 microampere beam current impinging on a tungsten target. The fiber is subjected to the high energy at a dose rate of about 50 mrep. (million roentgen equivalent physicals) per minute until a total dosage of about 10 mrep. is obtained. The pre-irradiated fiber is then immersed in VM and heated for about 4 hours at 100° C. It is then removed from the monomer, washed thoroughly with water and dried. The fiber dyes to deep and level shades of coloration with 4 percent Calcodur Pink 2BL. The Calcodur Pink 2BL-dyed fiber has a reflectance value of about 10. In comparison, a sample of the same fiber that is not so treated is not at all stained when it is attempted to be dyed with the same dyestuff and has a reflectance value of much more than 100. The graft copolymerized product has about a 50 Judd Unit improvement.

*Illustration K*

Polypropylene fiber similar to that employed in the first illustration is treated with ozone for about 1½ hours at 25° C. The sample is then placed in a mixture of 25 percent VM, 25 percent ethylene diacrylate and 50 percent N-methyl pyrrolidone wherein it is heated for 4 hours at a temperature of 100° C. Excellent dyeability with a wide variety of dyestuffs, including Calcodur Pink 2BL, Amacel Scarlet BS and Calcocid Alizarine Violet is obtained. The graft copolymerized polypropylene fiber product has a sticking temperature of about 155° C. and a melting point of about 200° C.

Results similar to the foregoing may also be obtained when any other of the mentioned alkyl-ring-substituted homologues of N-vinyl-3-morpholinone are utilized in a similar manner in place of those set forth in the above examples and when graft copolymers are prepared with such monomers on other varieties of non-aromatic, hydrocarbon olefin polymer substrates.

What is claimed is:

1. Dye-receptive graft copolymer composition comprised of (1) a substrate polyolefin of a non-aromatic monoolefin having 2 to 6 carbon atoms therein, said polyolefin having attached to carbon atoms in its structure, as graft copolymerized substituents thereon, up to about 20 weight percent, based on graft copolymer composition weight of (2) polymerized N-vinyl-3-morpholinone.

2. The composition of claim 1, wherein said polyolefin has between about 5 and 15 percent by weight, based on the weight of the composition, of said graft copolymerized substituents attached thereto.

3. The composition of claim 1, wherein said polyolefin is polypropylene.

4. A filamentary shaped article comprised of the composition set forth in claim 3.

5. A filamentary shaped article comprised of the composition set forth in claim 1.

6. Method for the preparation of a dye-receptive graft copolymer composition which comprises mixing an N-vinyl-3-morpholinone monomer with a preformed polyolefin that is a polymer of a non-aromatic monoolefin having 2 to 6 carbon atoms therein, then subjecting said mixture to polymerization at a temperature between 0° C. and 200° C. until up to about 20 weight percent, based on resulting composition weight, of said N-vinyl-3-morpholinone monomer is polymerized as graft copolymer substituents on carbon atoms in the structure of said polyolefin.

References Cited in the file of this patent

UNITED STATES PATENTS

| | | |
|---|---|---|
| 2,818,362 | Drechsel | Dec. 31, 1957 |
| 2,891,058 | Walles et al. | June 16, 1959 |
| 2,948,708 | Walles et al. | Aug. 9, 1960 |